US012592327B2

(12) United States Patent
Aramaki et al.

(10) Patent No.: US 12,592,327 B2
(45) Date of Patent: Mar. 31, 2026

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Miyu Aramaki, Osaka (JP); Housei Mizuno, Osaka (JP); Kyousyou Kou, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 173 days.

(21) Appl. No.: 18/570,331

(22) PCT Filed: Jun. 16, 2022

(86) PCT No.: PCT/JP2022/024079
§ 371 (c)(1),
(2) Date: Dec. 14, 2023

(87) PCT Pub. No.: WO2023/276691
PCT Pub. Date: Jan. 5, 2023

(65) Prior Publication Data

US 2024/0274318 A1 Aug. 15, 2024

(30) Foreign Application Priority Data

Jun. 30, 2021 (JP) ................................ 2021-108725

(51) Int. Cl.
*H01B 7/08* (2006.01)

(52) U.S. Cl.
CPC ................................ *H01B 7/0823* (2013.01)

(58) Field of Classification Search
CPC ...... H01B 7/08; H01B 7/0823; H01B 7/0846; H01B 7/40; H02G 3/04; H02G 3/22; H02G 3/305
(Continued)

(56) References Cited

U.S. PATENT DOCUMENTS

2006/0011375 A1* 1/2006 Sugimoto ............. H02G 3/305 174/117 F
2021/0027916 A1 1/2021 Mizuno et al.
2022/0212614 A1 7/2022 Sumida et al.

FOREIGN PATENT DOCUMENTS

JP 2006-19055 1/2006
JP 2008108756 A * 5/2008 ............ H01L 23/36
(Continued)

OTHER PUBLICATIONS

International Search Report issued in International Patent Application No. PCT/JP2022/024079, dated Aug. 9, 2022.
(Continued)

*Primary Examiner* — Timothy J Thompson
*Assistant Examiner* — Guillermo J Egoavil
(74) *Attorney, Agent, or Firm* — GREENBLUM & BERNSTEIN, P.L.C.

(57) ABSTRACT

A wiring member includes: a first sheet material; a second sheet material overlapped with the first sheet material; and a fixed wire-like transmission member and a free wire-like transmission member located between the first sheet material and the second sheet material, wherein the second sheet material is fixed to the first sheet material in a first fixing part and a second fixing part away from the first fixing part, the fixed wire-like transmission member is fixed to the first sheet material between the first fixing part and the second fixing part, and the free wire-like transmission member is disposed between the first sheet material and the second
(Continued)

sheet material while being parallelly arranged to the fixed wire-like transmission member.

8 Claims, 7 Drawing Sheets

(58) Field of Classification Search
USPC .............................................. 174/72 R, 117 F
See application file for complete search history.

(56) References Cited

FOREIGN PATENT DOCUMENTS

| | | | | |
|---|---|---|---|---|
| JP | 2019-179630 | | 10/2019 | |
| WO | 2019/225091 | | 11/2019 | |
| WO | WO-2020031662 | A1 * | 2/2020 | ............... H01B 7/00 |
| WO | 2020/241220 | | 12/2020 | |
| WO | WO-2020241220 | A1 * | 12/2020 | ......... B60R 16/0215 |

OTHER PUBLICATIONS

International Preliminary Report on Patentability issued in International Patent Application No. PCT/JP2022/024079, dated Jul. 21, 2023.

Japan, Notice of Reasons for Refusal received in Japanese Patent Application No. 2021-108725, dated Oct. 8, 2024.

* cited by examiner

WIRING MEMBER

TECHNICAL FIELD

The present disclosure relates to a wiring member.

BACKGROUND ART

Patent Document 1 discloses a wire harness in which an insulating covering of an electrical wire and a sheet material are directly welded and fixed to each other.

PRIOR ART DOCUMENTS

Patent Document(s)

Patent Document 1: Japanese Patent Application Laid-Open No. 2019-179630

SUMMARY

Problem to be Solved by the Invention

It is desired that a plurality of electrical wires can be easily kept flat by a sheet material.

Accordingly, an object of the present disclosure is to provide a technique capable of easily manufacturing a wiring member keeping a plurality of wire-like transmission members flat.

Means to Solve the Problem

A wiring member according to the present disclosure is a wiring member including: a first sheet material; a second sheet material overlapped with the first sheet material; and a fixed wire-like transmission member and a free wire-like transmission member located between the first sheet material and the second sheet material, wherein the second sheet material is fixed to the first sheet material in a first fixing part and a second fixing part away from the first fixing part, the fixed wire-like transmission member is fixed to the first sheet material between the first fixing part and the second fixing part, and the free wire-like transmission member is disposed between the first sheet material and the second sheet material while being parallelly arranged to the fixed wire-like transmission member.

Effects of the Invention

According to the present disclosure, a wiring member keeping a plurality of wire-like transmission members flat can be easily manufactured.

DESCRIPTION OF EMBODIMENT(S)

Description of Embodiment of Present Disclosure

Figure 1:
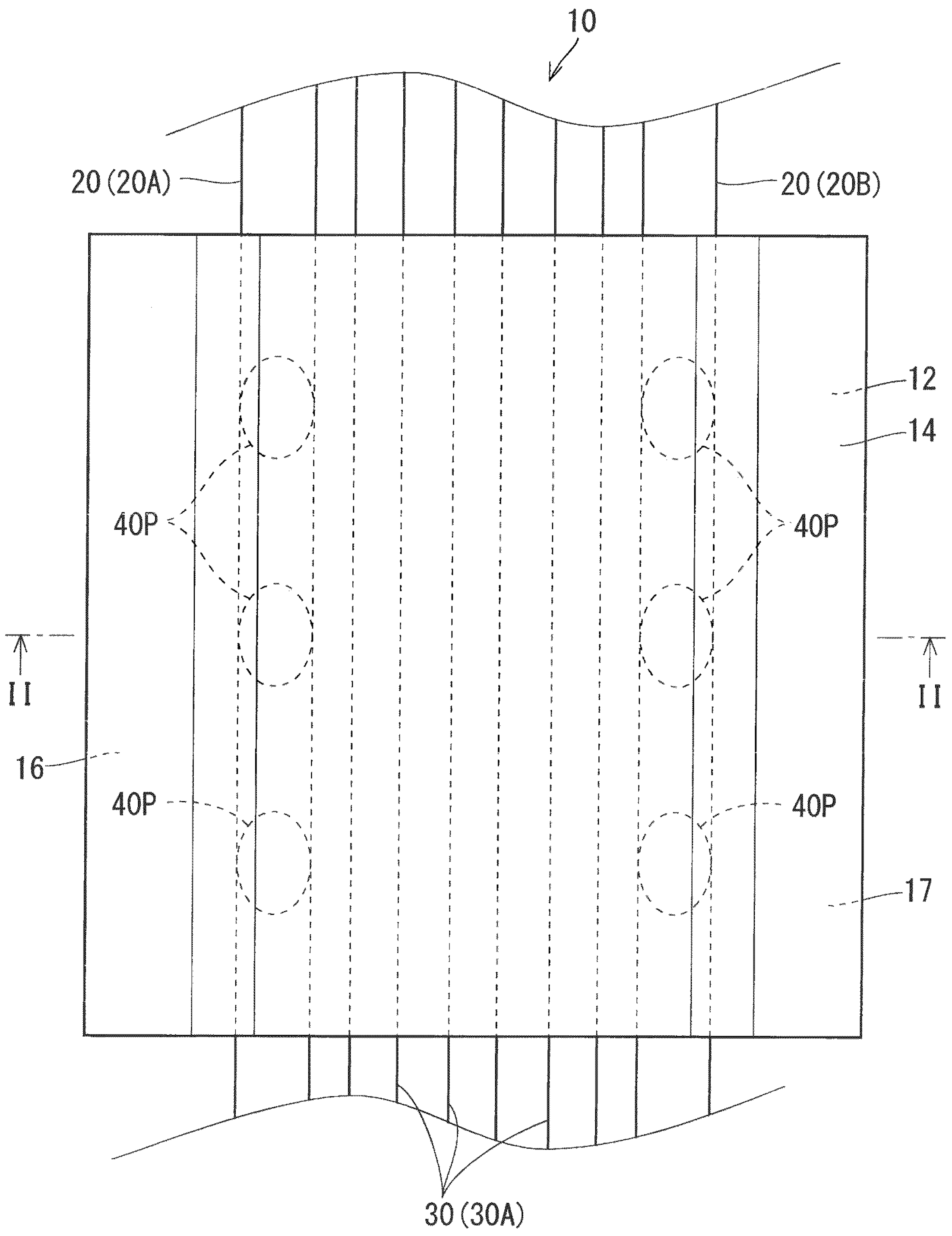
FIG. 1 is a plan view illustrating a wiring member.

Embodiments of the present disclosure are listed and described firstly.

A wiring member according to the present disclosure is as follows.

(1) A wiring member includes: a first sheet material; a second sheet material overlapped with the first sheet material; and a fixed wire-like transmission member and a free wire-like transmission member located between the first sheet material and the second sheet material, wherein the second sheet material is fixed to the first sheet material in a first fixing part and a second fixing part away from the first fixing part, the fixed wire-like transmission member is fixed to the first sheet material between the first fixing part and the second fixing part, and the free wire-like transmission member is disposed between the first sheet material and the second sheet material while being parallelly arranged to the fixed wire-like transmission member.

According to the wiring member, the free wire-like transmission member is parallelly arranged to the fixed wire-like transmission member, thereby being disposed between the first sheet material and the second sheet material while a route thereof is regulated by the fixed wire-like transmission member. Thus, the route of the free wire-like transmission member can be regulated between the first sheet material and the second sheet material even when the free wire-like transmission member is not fixed to the first sheet. Accordingly, a wiring member keeping a plurality of wire-like transmission members flat can be easily manufactured.

(2) In the wiring member according to (1), it is applicable that the fixed wire-like transmission member includes a first fixed wire-like transmission member and a second fixed wire-like transmission member located away from each other and fixed in a parallel state between the first fixing part and the second fixing part, and the free wire-like transmission member includes an intermediate free wire-like transmission member disposed between the first fixed wire-like transmission member and the second fixed wire-like transmission member. Accordingly, the intermediate free wire-like transmission member can be housed between the first fixed wire-like transmission member and the second fixed wire-like transmission member.

(3) In the wiring member according to (1) or (2), rigidity may be different between the first sheet material and the second sheet material. In this case, one of the first sheet material and the second sheet material having lower rigidity can be stretched against the other one thereof having higher rigidity. Accordingly, the first fixed wire-like transmission member and the second fixed wire-like transmission member can be held to be arranged side by side between the first sheet material and the second sheet material.

(4) In the wiring member according to any one of (1) to (3), the fixed wire-like transmission member may be thicker than the free wire-like transmission member. Accordingly, a route of a thin free wire-like transmission member can be easily regulated by a relatively thick fixed wire-like transmission member.

(5) In the wiring member according to any one of (1) to (4), the fixed wire-like transmission member may have contact with the second sheet material. Accordingly, a route of the free wire-like transmission member can be easily regulated along the fixed wire-like transmission member.

(6) In the wiring member according to any one of (1) to (5), a surface material of the fixed wire-like transmission member may have characteristics that peeling strength by fusion to the first sheet material is substantially equal to or larger than peeling strength of the free wire-like transmission member by fusion to the first sheet material. Accordingly, the fixed wire-like transmission member can be rigidly fixed to the first sheet material.

DETAILED DESCRIPTION OF EMBODIMENT OF PRESENT DISCLOSURE

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment

Figure 2:
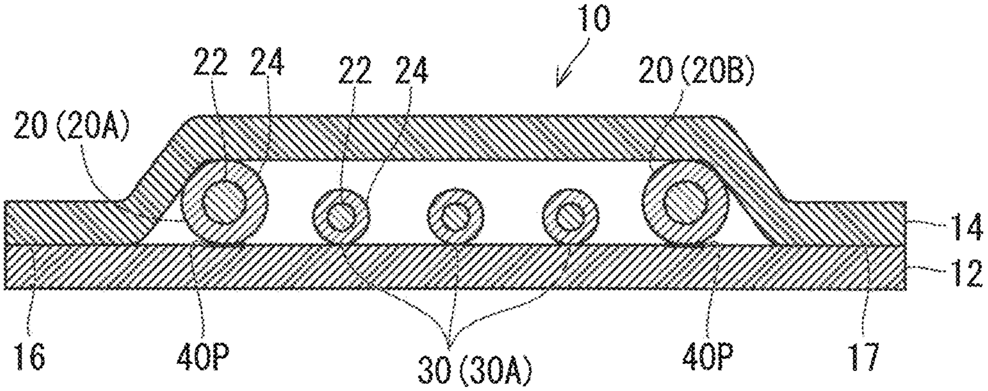
FIG. 2 is a cross sectional view along a II-II line in FIG. 1.

A wiring member according to an embodiment is described hereinafter. FIG. 1 is a plan view illustrating a wiring member 10. FIG. 2 is a cross-sectional view along a II-II line in FIG. 1.

The wiring member 10 includes a first sheet material 12, a second sheet material 14, a fixed wire-like transmission member 20, and a free wire-like transmission member 30.

The first sheet material 12 may be formed into a shape along wiring routes of the fixed wire-like transmission member 20 and the free wire-like transmission member 30. Herein, the first sheet material 12 is formed into a rectangular shape elongated in one direction. The first sheet material may be a bended. The first sheet material may have a part bended to have a curved shape. The first sheet material may have a branched part.

A material constituting the first sheet material 12 is not particularly limited, however, the first sheet material 12 may be formed of a material containing resin of polyvinyl chloride (PVC), polyethylene terephthalate (PET), or polypropylene (PP), for example. The first sheet material 12 may be a sheet material with an inner portion evenly filled or a non-woven sheet, for example. The first sheet material 12 may contain a material such as metal, for example. The first sheet material 12 preferably has flexibility of being easily bended in a thickness direction. The first sheet material 12 may be a single layer or a plurality of stacked layers. When the first sheet material 12 is made up of the plurality of stacked layers, it is considered that a resin layer and a resin layer are stacked, for example. More specifically, for example, the first sheet material 12 is considered to be made up of a resin sheet material with an inner portion evenly filled and a non-woven sheet stacked on each other. For example, the resin sheet material with the inner portion evenly filled may be a sheet material which can fuse the fixed wire-like transmission member 20. The non-woven sheet may be a layer bonded to a resin sheet material with the inner portion evenly filled while a part of the resin sheet material is melted to fills voids between fibers. In this case, the fixed wire-like transmission member 20 is fixed to the resin sheet material with the inner portion evenly filled. It is also considered that the first sheet material 12 is made up of a resin layer and a metal layer stacked on each other, for example.

The second sheet material 14 is overlapped with the first sheet material 12. The second sheet material 14 may be made up of a sheet material made of the same material as the first sheet material 12 described above.

The second sheet material 14 is fixed to the first sheet material 12 in the first fixing part 16 and a second fixing part 17 away from the first fixing part 16. In the present embodiment, the first sheet material 12 and the second sheet material 14 have the same rectangular shape. A portion where one side part of the first sheet material 12 and one side part of the second sheet material 14 are overlapped and fixed to each other serves as the first fixing part 16. A portion where the other side part of the first sheet material 12 and the other side part of the second sheet material 14 are overlapped and fixed to each other serves as the second fixing part 17. The first sheet material 12 and the second sheet material 14 may be fixed to each other by welding such as ultrasonic welding or thermal welding, for example. The first sheet material 12 and the second sheet material 14 may also be fixed by a gluing agent or an adhesive agent. The first fixing part 16 and the second fixing part 17 may be a part in which the first sheet material 12 and the second sheet material 14 are continuously fixed or intermittently fixed.

In the present embodiment, the first sheet material 12 and the second sheet material 14 have the same rectangular shape, and both side parts thereof are continuously fixed to each other. The first sheet material 12 and the second sheet material 14 are not fixed to each other between the first fixing part 16 and the second fixing part 17. Thus, a space where the fixed wire-like transmission member 20 and the free wire-like transmission member 30 described above can be disposed can be formed between the first sheet material 12 and the second sheet material 14 and between the first fixing part 16 and the second fixing part 17.

The first sheet material 12 and the second sheet material 14 do not necessarily have the same shape. For example, the second sheet material 14 smaller than the first sheet material 12 may be fixed to the first sheet material 12 in the first fixing part and the second fixing part away from each other while being overlapped with a partial region in the first sheet material 12.

The first sheet material 12 and the second sheet material 14 may have substantially the same rigidity or different rigidity. The difference of rigidity may be obtained by a difference of a material (for example, a difference of rigid PVC or flexible PVC) constituting the sheet material or a thickness thereof, for example. The rigidity may be different between the first sheet material 12 and the second sheet material 14. For example, it is applicable that the second sheet material 14 has rigidity large enough to be able to keep a state of planarly extending by itself, and the first sheet material 12 has flexibility large enough to be easily bended. In this case, the second sheet material 14 is fixed to the first sheet material 12 in the first fixing part 16 and the second fixing part 17 described hereinafter, the first sheet material 12 can be kept in a stretched state between the first fixing part 16 and the second fixing part 17.

The fixed wire-like transmission member 20 and the free wire-like transmission member 30 are members located between the first sheet material 12 and the second sheet material 14.

Herein, the wire-like transmission member constituting the fixed wire-like transmission member 20 and the free wire-like transmission member 30 is a wire-like member transmitting electrical power or light, for example. The wire-like transmission member includes a transmission wire body 22 and a covering layer 24. For example, the wire-like transmission member may be a general wire having a core wire and the covering layer 24 around the core wire, or may also be a shielded wire, a twisted wire, an enamel wire, a nichrome wire, or an optical fiber.

The wire-like transmission member transmitting the electrical power may be various kinds of signal lines or various kinds of power lines. Some of the wire-like transmission members transmitting the electrical power may be used as an antenna or coil, for example, transmitting or receiving a signal or electrical power to or from a space.

The wire-like transmission member may be a single wire-like object or a composite object of a plurality of wire-like objects (a twisted wire and a cable made up of a plurality of wire-like objects covered by a sheath).

Described in the present embodiment is an example that two fixed wire-like transmission members 20 and three free wire-like transmission members 30 are disposed in a parallel state between the first sheet material 12 and the second sheet material 14. The fixed wire-like transmission member 20 and the free wire-like transmission member 30 may be bended or branched at a part other than a part where they are parallelly disposed.

The fixed wire-like transmission member 20 includes a first fixed wire-like transmission member 20A and a second fixed wire-like transmission member 20B. In the description hereinafter, the fixed wire-like transmission member 20 is distinguished into the first fixed wire-like transmission member 20A and the second fixed wire-like transmission member 20B as necessary in some cases. The first fixed wire-like transmission member 20A and the second fixed wire-like transmission member 20B are fixed to the first sheet material 12 while being away from each other in a parallel state between the first fixing part 16 and the second fixing part 17 described above.

A configuration of fixing the fixed wire-like transmission member 20 to the first sheet material 12 is optionally applied. Applicable as the fixing state of fixing the fixed wire-like transmission member 20 to the first sheet material 12 are a contact area fixation and a non-contact area fixation, or both fixations may be used together. Herein, the contact area fixation indicates that a portion where the fixed wire-like transmission member 20 and the first sheet material 12 have contact with each other is stuck and fixed. The non-contact area fixation indicates the fixing state which is not the contact area fixation, and a sewing thread or an adhesive tape, for example, keeps pressing the fixed wire-like transmission member 20 toward the first sheet material 12.

Applicable as the configuration of the contact area fixation are a contact area indirect fixation and a contact area direct fixation, or both fixations may also be used together in different regions. Herein, the contact area indirect fixation indicates that the fixed wire-like transmission member 20 and the first sheet material 12 are indirectly stuck and fixed via an adhesive agent, a gluing agent, and a double-sided adhesive tape provided therebetween. The contact area direct fixation indicates that the fixed wire-like transmission member 20 and the first sheet material 12 are directly stuck and fixed without an intervention of the adhesive agent, for example, which is separately provided. Considered in the contact area direct fixation is that resin included in at least one of the fixed wire-like transmission member 20 and/or the first sheet material 12 is melted, thus are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the fixed wire-like transmission member 20 and the first sheet material 12 are in the state of the contact area direct fixation by these means. Specifically, when the state of the contact area direct fixation is formed by the ultrasonic welding, for example, the fixed wire-like transmission member 20 and the first sheet material 12 are in the state of the contact area direct fixation by the ultrasonic welding.

The description hereinafter is based on a premise that the fixed wire-like transmission member 20 and the first sheet material 12 are fixed by the ultrasonic welding. An ultrasonic welding position may be continuously or intermittently formed along a longitudinal direction of the fixed wire-like transmission member 20. FIG. 1 illustrates an example that an ultrasonic welding position 40P are intermittently provided along the longitudinal direction of the fixed wire-like transmission member 20.

The free wire-like transmission member 30 is disposed between the first sheet material 12 and the second sheet material 14 while being parallelly arranged to the fixed wire-like transmission member 20. The free wire-like transmission member 30 is not fixed to the first sheet material 12. The free wire-like transmission member 30 is not also fixed to the second sheet material 14. The free wire-like transmission member 30 is disposed along the fixed wire-like transmission member 20 while movement thereof in the thickness direction of the present wiring member 10 is regulated between the first sheet material 12 and the second sheet material 14, thus the route thereof is regulated to follow the fixed wire-like transmission member 20.

In the present embodiment, the free wire-like transmission member 30 includes an intermediate free wire-like transmission member 30A disposed between the first fixed wire-like transmission member 20A and the second fixed wire-like transmission member 20B. Herein, all of the plurality of (three) free wire-like transmission members 30 are the intermediate free wire-like transmission members 30A. The intermediate free wire-like transmission member 30A is disposed between the first fixed wire-like transmission member 20A and the second fixed wire-like transmission member 20B, thus the intermediate free wire-like transmission member 30A hardly protrudes to an outer lateral side of the first fixed wire-like transmission member 20A and the second fixed wire-like transmission member 20B. Thus, the intermediate free wire-like transmission member 30A can be maintained more reliably along a predetermined route.

It is not necessary that the plurality of free wire-like transmission members 30 do not intersect with each other but are disposed in a parallel state between the first fixed wire-like transmission member 20A and the second fixed wire-like transmission member 20B. It is applicable that the plurality of free wire-like transmission members 30 extend to a space between the first fixed wire-like transmission member 20A and the second fixed wire-like transmission member 20B while being overlapped or intersecting with each other between the first fixed wire-like transmission member 20A and the second fixed wire-like transmission member 20B.

The fixed wire-like transmission member 20 described above may be thicker than the free wire-like transmission member 30. When the fixed wire-like transmission member 20 is thick, the fixed wire-like transmission member 20 can protrude from the first sheet material 12 to a large extent, thus a gap between the fixed wire-like transmission member 20 and the second sheet material 14 can be reduced. Accordingly, the route of the free wire-like transmission member 30 can be regulated more reliably by the fixed wire-like transmission member 20.

There is also a possibility that an operation of fixing the relatively thick fixed wire-like transmission member 20 to the first sheet material 12 is performed more easily than an operation of fixing the relatively thin free wire-like transmission member 30 thereto.

The fixed wire-like transmission member 20 may have contact with the second sheet material 14. Accordingly, the free wire-like transmission member 30 is hardly moved through between the fixed wire-like transmission member 20 and the second sheet material 14, and the route of the free wire-like transmission member 30 is kept more constant.

The fixed wire-like transmission member 20 is fixed to the first sheet material 12, and the free wire-like transmission member 30 is not fixed to the first sheet material 12, thus the free wire-like transmission member 30 may be applied to a case where it is difficult to fix or fuse, for example, the free wire-like transmission member 30 to the first sheet material 12 compared with the fixed wire-like transmission member 20.

Example of the case include a case where a surface material of the electrical wire as the fixed wire-like transmission member 20 and a surface material of the free wire-like transmission member 30 have the following characteristics in a relationship with a surface material of a fixing surface of the first sheet material 12. The characteristics indicate that peeling strength of the fixed wire-like transmission member 20 by fusion to the first sheet material 12 is larger than that of the free wire-like transmission member 30 by fusion to the first sheet material 12. The peeling strength may be evaluated as follows. For example, the fixed wire-like transmission member 20 and the free wire-like transmission member 30 are fused to the first sheet material 12 in the same condition. For example, the fixed wire-like transmission member 20 and the free wire-like transmission member 30 are fused to the first sheet material 12 by ultrasonic welding in the same welding pressure, pressure time, and vibration condition. Then, the same type of detachment test (for example, a test according to a test regulated by JIS K6854) is performed on the fixed wire-like transmission member 20 and the free wire-like transmission member 30 fused to the first sheet material 12 to evaluate peeling strength. For example, performed is a 180 degrees detachment test in which the fixed wire-like transmission member 20 or the free wire-like transmission member 30 is folded back at 180 degrees to the first sheet material 12 and pulled or a T-type detachment test in which the first sheet material 12 and the fixed wire-like transmission member 20 or the free wire-like transmission member 30 are pulled to sides opposite to each other in a vertical direction with respect to the fusion surface. The same type of test is performed on the fixed wire-like transmission member 20 and the free wire-like transmission member 30 to evaluate a magnitude of the peeling strength.

A difference of the peeling strength can be caused by a combination of a constituent material of the fixing surface of the first sheet material 12 and a surface material of the fixed wire-like transmission member 20 and the free wire-like transmission member 30. For example, in a case where the fixing surface of the first sheet material 12 is formed of a material including PVC, considered is a case where the covering of the fixed wire-like transmission member 20 is formed of a material including PVC, and the covering of the free wire-like transmission member 30 is formed of a material including resin which does not include PVC such as olefin resin of polypropylene (PP), polyethylene terephthalate (PET), or fluorine resin.

A method of manufacturing the wiring member 10 described above is described.

Figure 3:
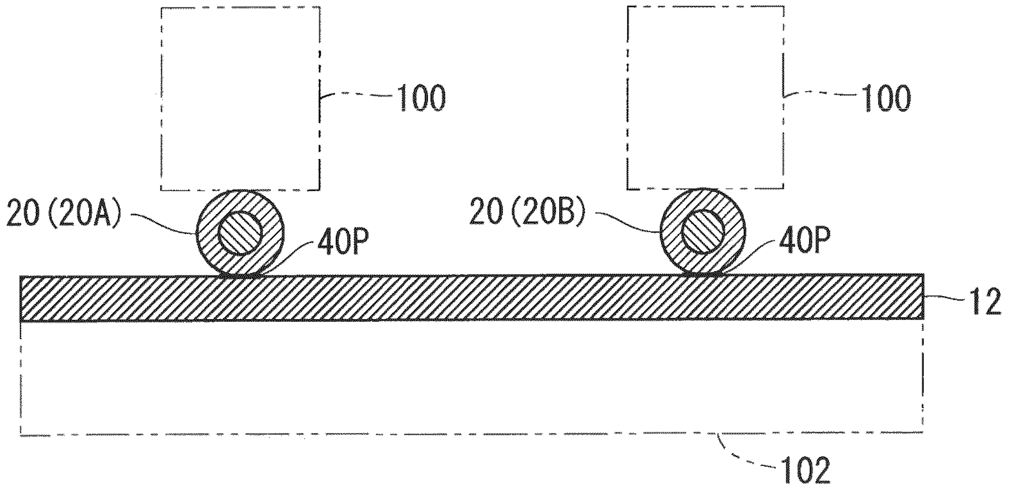
FIG. 3 is an explanation view illustrating an example of a manufacturing method of a wiring member.

As illustrated in FIG. 3, the fixed wire-like transmission member 20 is disposed on a fixing target surface of the first sheet material 12. Herein, the first fixed wire-like transmission member 20A and the second fixed wire-like transmission member 20B are disposed at intervals in a parallel state. In this state, a horn 100 and an anvil 102 for ultrasonic welding sandwich the first sheet material 12 and the fixed wire-like transmission member 20 to apply ultrasonic vibration energy. Accordingly, resin of at least one of the surface of the covering of the fixed wire-like transmission member 20 and/or the surface of the fixing target surface of the first sheet material 12 is melted. Then, the fixed wire-like transmission member 20 is fixed to the first sheet material 12 by the ultrasonic welding position 40P.

Figure 4:
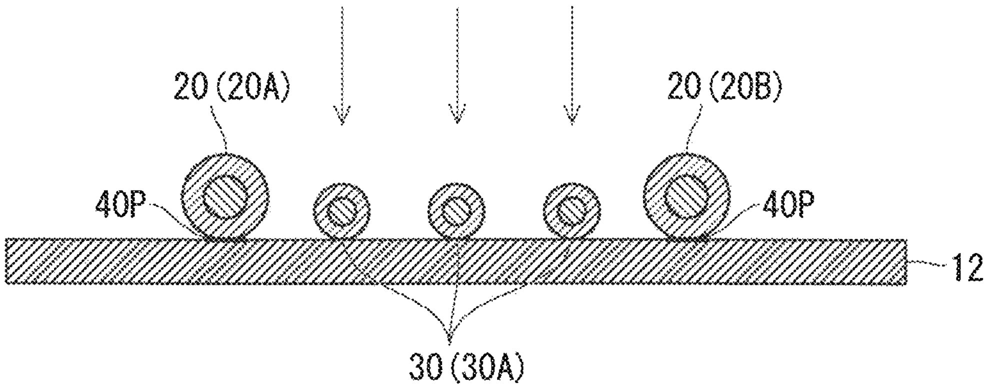
FIG. 4 is an explanation view illustrating an example of a manufacturing method of a wiring member.

Next, as illustrated in FIG. 4, the free wire-like transmission member 30 is disposed on the fixing target surface of the first sheet material 12. The fixed wire-like transmission member 20 is fixed to the first sheet material 12, thus the route of the free wire-like transmission member 30 is regulated by the fixed wire-like transmission member 20 on at least one side on the first sheet material 12. Herein, the free wire-like transmission member 30 is disposed between the first fixed wire-like transmission member 20A and the second fixed wire-like transmission member 20B, thus the route of the free wire-like transmission member 30 is regulated between the first fixed wire-like transmission member 20A and the second fixed wire-like transmission member 20B.

Figure 5:
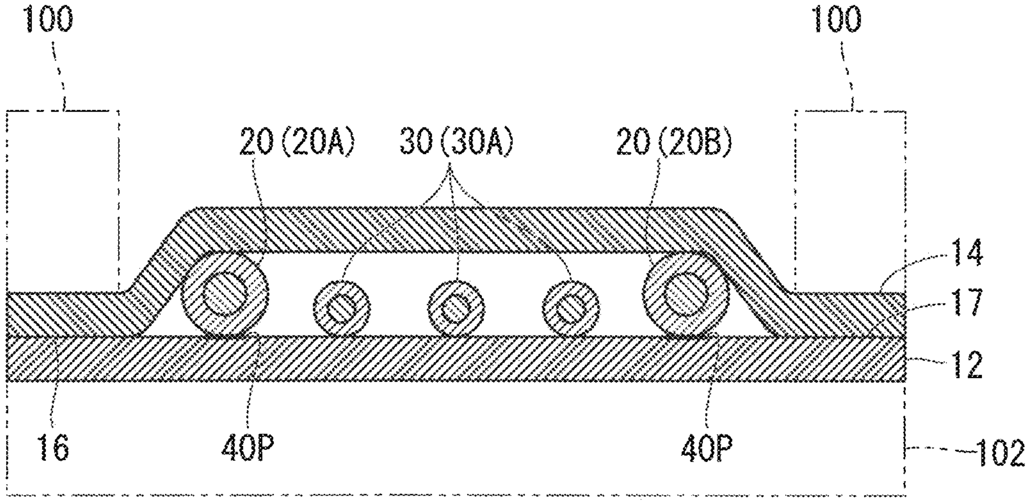
FIG. 5 is an explanation view illustrating an example of a manufacturing method of a wiring member.

Then, as illustrated in FIG. 5, the second sheet material 14 is overlapped with the first sheet material 12. In this state, the horn 100 and the anvil 102 for ultrasonic welding sandwich each side part of the first sheet material 12 and each side part of the second sheet material 14. At this time, the fixed wire-like transmission member 20 is fixed to an inner side of a fixing position by the horn 100 and the anvil 102 for ultrasonic welding, and a position of the free wire-like transmission member 30 is regulated to be arranged to an inner side of the fixed wire-like transmission member 20. Thus, the horn 100 and the anvil 102 for ultrasonic welding hardly sandwich the fixed wire-like transmission member 20 and the free wire-like transmission member 30. The ultrasonic vibration energy is applied to the position where the first sheet material 12 and the second sheet material 14 are overlapped with each other. Accordingly, each side part of the first sheet material 12 and each side part of the second sheet material 14 are welded by ultrasonic welding.

According to the wiring member 10 having such a configuration, the free wire-like transmission member 30 is parallelly arranged to the fixed wire-like transmission member 20, thereby being disposed between the first sheet material 12 and the second sheet material 14 while the route thereof is regulated by the fixed wire-like transmission member 20. Thus, the route thereof is regulated between the first sheet material 12 and the second sheet material 14 even when the free wire-like transmission member 30 is not fixed to the first sheet material 12. Accordingly, a wiring member keeping a plurality of wire-like transmission members including the fixed wire-like transmission member 20 and the free wire-like transmission member 30 flat can be easily manufactured.

The intermediate free wire-like transmission member 30A is disposed between the first fixed wire-like transmission member 20A and the second fixed wire-like transmission member 20B, thus the intermediate free wire-like transmission member 30 can be housed therebetween, and the route thereof can be regulated more reliably.

When the first sheet material 12 and the second sheet material 14 have rigidity different from each other, one of the first sheet material 12 and the second sheet material 14 having lower rigidity can be stretched against the other one thereof having higher rigidity. Accordingly, the fixed wire-like transmission member 20 and the free wire-like transmission member 30 can be easily held to be arranged side by side between the first sheet material 12 and the second sheet material 14.

When the fixed wire-like transmission member 20 has contact with the second sheet material 14, the route of the free wire-like transmission member 30 can be easily regulated along the fixed wire-like transmission member 20. As described above, when one of the first sheet material 12 and the second sheet material 14 having lower rigidity is stretched against the other one thereof having higher rigidity, it is easy to keep the fixed wire-like transmission member 20 in contact with the second sheet material 14.

When the fixed wire-like transmission member 20 is thicker than the free wire-like transmission member 30, the route of the free wire-like transmission member 30 can be easily regulated by the fixed wire-like transmission member 20.

Considered herein is a case where the wiring member 10 includes different types of electrical wires, for example. The types of electrical wires can be distinguished by a difference of a covering material or a thickness, for example. When the types of electrical wires are different, a condition of a fixing operation and easiness of fixation to the first sheet material 12 are different. For example, when the thickness of the electrical wire is different, a time and welding pressure in performing ultrasonic welding are different. A welding condition is considered to be changed also in a case where the covering of the electrical wire is different between PVC and olefin. In this manner, when the type of electrical wire is different, the welding condition is different, thus it is difficult to perform the welding operation at the same time. When the welding operation is performed for each type of electrical wire, the number of welding operations increases, and it is troublesome to manufacture the wiring member 10

A part of the fixed wire-like transmission member 20 is fixed to the first sheet material 12, the route of the other part of the free wire-like transmission member 30 is regulated by the fixed wire-like transmission member 20, the other part of the free wire-like transmission member 30 is not fixed to the first sheet material 12 as with the present wiring member 10, thus the number of welding operations can be reduced, and the wiring member 10 can be easily manufactured.

It is preferable that the fixed wire-like transmission member 20 can be fixed to the first sheet material 12 more rigidly or easily than the free wire-like transmission member 30. From the above viewpoint, it is sufficient that the surface material of the fixed wire-like transmission member 20 has the characteristics that the peeling strength of the fixed wire-like transmission member 20 by fusion to the first sheet material 12 is substantially equal to or larger than that of the free wire-like transmission member 30 by fusion to the first sheet material 12. Accordingly, the fixed wire-like transmission member 20 can be rigidly fixed to the first sheet material 12. The route of the free wire-like transmission member 30 can be regulated by the fixed wire-like transmission member 20 rigidly fixed.

Modification Example

Described in the present embodiment is the example that two fixed wire-like transmission members 20 are fixed to the first sheet material 12. The number of fixed wire-like transmission members fixed to the first sheet material 12 may be one, or three or more fixed wire-like transmission members are also applicable.

Figure 6:
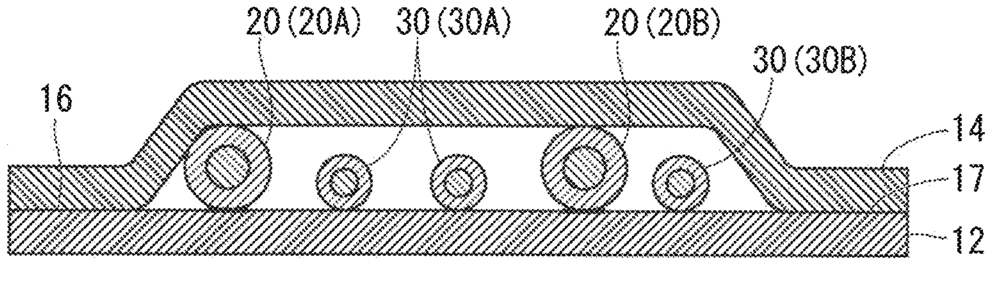
FIG. 6 is a cross-sectional view illustrating a wiring member according to a modification example.

Described in the above present embodiment is the example that all of the free wire-like transmission members 30 are disposed between the first fixed wire-like transmission member 20A and the second fixed wire-like transmission member 20B. However, the free wire-like transmission member 30 is not necessarily disposed between the first fixed wire-like transmission member 20A and the second fixed wire-like transmission member 20B. For example, as illustrated in FIG. 6, the free wire-like transmission member 30 may include an outer-side free wire-like transmission member 30B disposed an outer side but not between the first fixed wire-like transmission member 20A and the second fixed wire-like transmission member 20B.

Figure 7:
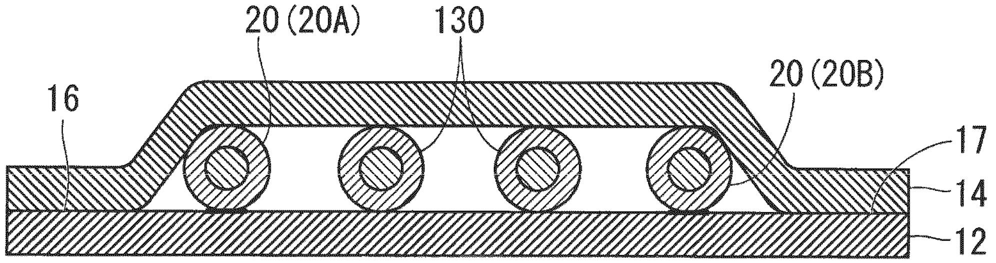
FIG. 7 is a cross-sectional view illustrating a wiring member according to another modification example.

The above embodiment describes the example that the free wire-like transmission member 30 is thinner than the fixed wire-like transmission member 20, however, the free wire-like transmission member 30 is not necessarily thinner than the fixed wire-like transmission member 20. As illustrated in FIG. 7, a free wire-like transmission member 130 corresponding to the free wire-like transmission member 30 may have the same thickness as the first fixed wire-like transmission member 20A and the second fixed wire-like transmission member 20B.

Each configuration described in the embodiments and modification examples thereof can be appropriately combined as long as they are not contradictory.

EXPLANATION OF REFERENCE SIGNS

10 wiring member
12 first sheet material
14 second sheet material
16 first fixing part
17 second fixing part
20 fixed wire-like transmission member (20A first fixed wire-like transmission member, 20B second fixed wire-like transmission member)
22 transmission wire body
24 covering layer
30, 130 free wire-like transmission member (30A intermediate free wire-like transmission member, 30B outer-side free wire-like transmission member)
40P ultrasonic welding position
100 horn
102 anvil

The invention claimed is:

1. A wiring member, comprising:

a first sheet material;

a second sheet material overlapped with the first sheet material; and a fixed wire-like transmission member and a free wire-like transmission member located between the first sheet material and the second sheet material, wherein the second sheet material is fixed to the first sheet material in a first fixing part and a second fixing part away from the first fixing part, an intermittent weld is provided along a longitudinal direction of the fixed wire-like transmission member and fixes the fixed wire-like transmission member is fixed to the first sheet material, the fixed wire-like transmission member being positioned between the first fixing part and the second fixing part, and the free wire-like transmission member is disposed between the first sheet material and the second sheet material while being parallelly arranged to the fixed wire-like transmission member.

2. The wiring member according to claim 1, wherein the fixed wire-like transmission member includes a first fixed wire-like transmission member and a second fixed wire-like transmission member located away from each other and fixed in a parallel state between the first fixing part and the second fixing part, and the free wire-like transmission member includes an intermediate free wire-like transmission member disposed between the first fixed wire-like transmission member and the second fixed wire-like transmission member.

3. The wiring member according to claim 1, wherein rigidity is different between the first sheet material and the second sheet material.

4. The wiring member according claim 1, wherein the fixed wire-like transmission member is thicker than the free wire-like transmission member.

5. The wiring member according to claim 1, wherein the fixed wire-like transmission member has contact with the second sheet material.

6. A wiring member, comprising:

a first sheet material;

a second sheet material overlapped with the first sheet material; and a fixed wire-like transmission member and a free wire-like transmission member located between the first sheet material and the second sheet material, wherein the second sheet material is fixed to the first sheet material in a first fixing part and a second fixing part away from the first fixing part, an intermittent weld is provided along a longitudinal direction of the fixed wire-like transmission member and fixes the fixed wire-like transmission member is fixed to the first sheet material, the fixed wire-like transmission member being positioned between the first fixing part and the second fixing part, the free wire-like transmission member is disposed between the first sheet material and the second sheet material while being parallelly arranged to the fixed wire-like transmission member, and a surface material of the fixed wire-like transmission member has characteristics that peeling strength by fusion to the first sheet material is larger than peeling strength of the free wire-like transmission member by fusion to the first sheet material.

7. The wiring member according to claim 1, wherein the fixed wire-like transmission member is fused and fixed to the first sheet material, and the free wire-like transmission member is disposed between the first sheet material and the second sheet material without being fused and fixed to the first sheet material and the second sheet material.

8. The wiring member according to claim 6, wherein the fixed wire-like transmission member is fused and fixed to the first sheet material, and the free wire-like transmission member is disposed between the first sheet material and the second sheet material without being fused and fixed to the first sheet material and the second sheet material.

* * * * *